United States Patent [19]

Nakagawa et al.

[11] Patent Number: 4,546,157
[45] Date of Patent: Oct. 8, 1985

[54] FLUORINE-CONTAINING COPOLYMER

[75] Inventors: Tsuneo Nakagawa, Ibaraki; Sadatsu Yamaguchi, Suita; Toshihiko Amano, Settsu; Kohzoh Asano, Ibaraki, all of Japan

[73] Assignee: Daikin Kogyo Co., Ltd., Osaka, Japan

[21] Appl. No.: 420,614

[22] Filed: Sep. 21, 1982

[30] Foreign Application Priority Data

Sep. 21, 1981 [JP] Japan ................. 56-150418

[51] Int. Cl.$^4$ ............................................ C08F 214/26
[52] U.S. Cl. .................................................... 526/247
[58] Field of Search ............................... 526/247, 254

[56] References Cited

U.S. PATENT DOCUMENTS

| | | | |
|---|---|---|---|
| 3,674,758 | 7/1972 | Carlson | 526/247 |
| 3,855,191 | 12/1974 | Doughty et al. | 526/254 |
| 4,038,231 | 7/1977 | Downer et al. | 526/254 |
| 4,078,135 | 3/1978 | Sulzbach et al. | 526/247 |
| 4,262,101 | 4/1981 | Hartwimmer et al. | 526/247 |
| 4,381,387 | 4/1983 | Sulzbach | 526/247 |

*Primary Examiner*—Harry Wong, Jr.
*Attorney, Agent, or Firm*—Birch, Stewart, Kolasch & Birch

[57] ABSTRACT

A fluorine-containing copolymer comprising monomeric units of (a) from 95.8 to 80% by weight of tetrafluoroethylene,
(b) from 4 to 14% by weight of hexafluoropropene, and
(c) from 0.2 to 6% by weight of perfluorovinyl ether of the formula:

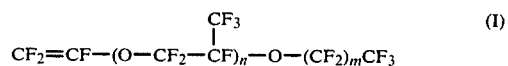

(I)

wherein n is an integer of 1 to 4, and m is an integer of 0 to 3, and having excellent stress crack resistance when formed into a molded article.

6 Claims, No Drawings

FLUORINE-CONTAINING COPOLYMER

This invention relates to a fluorine-containing copolymer. More particularly, it relates to a fluorine-containing copolymer comprising units of tetrafluoroethylene (hereinafter referred to as "TFE"), hexafluoropropene (hereinafter referred to as "HFP") and a certain specific perfluorovinyl ether.

It is known that a copolymer of TFE and HFP (hereinafter referred to as "FEP copolymer") is melt-extrudable (cf. U.S. Pat. Nos. 2,549,935 and 2,598,283). A molded article of FEP copolymer has excellent heat resistance, weather resistance and chemical resistance but is inferior in stress crack resistance. In order to improve the inferior stress crack resistance of this molded article, the melt viscosity of the polymer should be made high. However, such high melt viscosity results in deteriorated melt moldability.

For overcoming the above drawbacks of FEP copolymer, incorporation of a perfluoroalkyl vinyl ether of the formula:

$$CF_2=CF-O-(CF_2)_n-CF_3$$

wherein n is an integer of 1 or 2 as the third monomeric component therein has been proposed (cf. U.S. Pat. No. 4,029,868). However, this third monomeric component is expensive. Further, a relatively large amount of such component is needed to attain the improving effect.

Incorporation of a perfluorovinyl ether of the formula:

$$CF_2=CF-O-(CF_2)_2-CF_3$$

as the third monomeric component into FEP copolymer has also been proposed in U.S. Pat. No. 4,029,868. However, the same disadvantages as above can not be avoided.

As a result of an extensive study to improve the drawbacks of FEP copolymer, it has now been found that copolymerization of a specific perfluorovinyl ether as the third monomeric component with TFE and HFP affords a fluorine-containing copolymer which has good moldability and stress crack resistance when formed into a molded article.

According to the present invention, there is provided a fluorine-containing copolymer comprising monomeric units of
(a) from 95.8 to 80% by weight of tetrafluoroethylene,
(b) from 4 to 14% by weight of hexafluoropropene, and
(c) from 0.2 to 6% by weight of perfluorovinyl ether of the formula:

$$CF_2=CF-(O-CF_2-\overset{CF_3}{\underset{|}{CF}})_n-O-(CF_2)_mCF_3 \quad (I)$$

wherein n is an integer of 1 to 4, and m is an integer of 0 to 3.

An article molded from the copolymer of the invention has excellent stress crack resistance. For example, FEP copolymer having a melt viscosity of lower than $4 \times 10^4$ poise shows only deteriorated stress crack resistance when in the form of a molded article. To the contrary, the copolymer of the invention when in the form of a molded article shows good stress crack resistance even when the melt viscosity of the polymer is about $4 \times 10^4$ poise.

The perfluorovinyl ether (I) is known and described, for example, in U.S. Pat. No. 3,450,682. A copolymer of the perfluorovinyl ether (I) and any other fluoroolefin is described in U.S. Pat. No. 3,450,682. However, the copolymer of the invention and its characteristics has not been known.

The perfluorovinyl ether (I) may be easily prepared by the process as described in U.S. Pat. No. 3,450,682. Advantageously, its production cost is relatively low.

For the production of the copolymer of the invention, various conventional polymerization methods and conditions can be adopted. Any of bulk polymerization, solution polymerization, suspension polymerization and emulsion polymerization may be employed. Polymerization is generally initiated by the presence of a polymerization initiator in the reaction system. Any initiator that does not deteriorate thermal properties of the resulting copolymer can be employed. For example, highly fluorinated peroxides of the formula:

$$(R_fCOO)_2$$

wherein Rf is perfluoroalkyl, ω-hydroperfluoroalkyl or perchlorofluoroalkyl are preferably used.

In order to facilitate the contact between the monomers, a reaction medium can be used. Specific examples of the medium are halogenated hydrocarbons (e.g. 1,1,2-trichloro-1,2,2-trifluoroethane, 1,2-dichloro-1,1,2,2-tetrafluoroethane, trichlorofluoromethane, dichlorodifluoromethane, perfluorocyclobutane, HFP dimer, etc.), water, etc.

The copolymerization is preferably effected in the presence of a chain transfer agent which is used in conventional radical polymerization. Specific examples of the chain transfer agent are isoparaffin, carbon tetrachloride, diethyl malonate, mercaptan, diethyl ether, alcohols, etc.

If necessary, a polymerization stabilizer (e.g. methyl cellulose, polyvinyl alcohol), a pH adjuster (e.g. a phosphoric acid—phosphate buffer, a boric acid—borate buffer) may be added to the polymerization system.

Other reaction conditions such as the reaction temperature and the reaction pressure are not critical and may be the same as employed in the conventional copolymerization of THF and HFP. Generally, the reaction temperature may be from 10° to 50° C., preferably from 20° to 40° C., and more preferably a temperature around room temperature. The reaction pressure may be from 5 to 25 Kg/cm²G, usually an autogenic pressure of the monomers.

The composition of the monomeric unit in the copolymer is usually 95.8–80% by weight of TFE, 4–14% by weight of HFP and 0.2–6% by weight of the perfluorovinyl ether (I), preferably 94.5–83% by weight of TFE, 5–13% by weight of HFP and 0.5–4% by weight of the perfluorovinyl ether (I). When the content of the perfluorovinyl ether (I) is less than 0.2% by weight, the drawbacks of FEP copolymer, especially poor stress crack resistance of molded articles formed from the copolymer, are not desirably improved. When the content of the perfluorovinyl ether (I) is more than 6% by weight, the melting point of the copolymer is greatly lowered.

The pressure invention will be hereinafter explained in detail by the following Examples, wherein % and part are by weight unless otherwise indicated.

Characteristics and physical properties of the polymers obtained in Examples are measured as follows:

(a) Composition of copolymer

The content of perfluorovinyl ether (I) and HFP are determined by measuring the infrared spectrum of a film of 0.05±0.01 mm or 0.10±0.01 mm in thickness which is formed at 350° C. by means of a infrared spectrophotometer (IR-440 made by Shimadzu).

Characteristic absorption for perfluorovinyl ether (I) in the copolymer is found at 998 cm$^{-1}$ and 1340 cm$^{-1}$. However, the absorption at 998 cm$^{-1}$ overlaps the characteristic absorption at 980 cm$^{-1}$ for HFP. Therefore, the content of perfluorovinyl ether (I) wherein n is 1 (hereinafter referred to as "n-1VE") is calculated from the absorbance at 1340 cm$^{-1}$ and that at 2350 cm$^{-1}$ measured on the film of 0.10±0.01 mm in thickness according to the following equation:

$$\text{n-1VE content (\%)} = 2.4 \times \frac{D_{1340\ cm-1}}{D_{2350\ cm-1}}$$

wherein $D_{1340\ cm-1}$ is the absorbance at 1340 cm$^{-1}$ and $D_{2350\ cm-1}$ is that at 2350 cm$^{-1}$.

The content of HFP is calculated from the absorbance at 980 cm$^{-1}$ according to the following equation in which the content of n-1VE is corrected:

$$\text{HFP content (\%)} = 3.2 \left[ \frac{D_{980\ cm-1}}{D_{2350\ cm-1}} - 0.25 \times \text{n-1VE content (\%)} \right]$$

(film thickness of 0.05±0.01 mm)

Each content of CF$_2$=CF—O—CF$_2$CF$_2$CF$_3$ (hereinafter referred to as "n-0VE") and HFP in TFE/HFP/n-0VE copolymer is calculated in the same manner as in the case of THF/HFP/n-1VE copolymer according to the following equations respectively:

$$\text{n-0VE content (\%)} = 3.75 \times \frac{D_{1340\ cm-1}}{D_{2350\ cm-1}}$$

(film thickness of 0.10±0.01 mm)

$$\text{HFP content (\%)} = 3.2 \left[ \frac{D_{980\ cm-1}}{D_{2350\ cm-1}} - 0.13 \times \text{n-1VE content (\%)} \right]$$

(film thickness of 0.05±0.01 mm)

(b) Specific melt viscosity

A Koka-type flow tester is used. A copolymer is charged in a cylinder of 9.5 mm in inner diameter and kept at 380° C. for 5 minutes. Then, the copolymer is extruded from an orifice at 2.1 mm in inner diameter and 8 mm in length under piston load of 5 Kg. Specific melt viscosity is calculated by dividing 53150 by the extrusion rate (g/minute).

(c) Melting point

Perkin-Elmer DSC II type is used. A copolymer is heated from a room temperature at a rate of 10° C./minute, and the peak value of the melting curve is assigned to a melting point.

EXAMPLE 1

In a glass made autoclave equipped with a stirrer, which can contain 1000 parts of water, demineralized and deaerated pure water (260 parts) was charged. The interior was replaced thoroughly with pure nitrogen and evacuated. Thereafter, n-1VE (10 parts) was injected, followed by HFP (260 parts). The mixture in the autoclave was stirred at 25° C. Then, the autoclave was pressurized with THF to 8.5 Kg/cm$^2$G. As soon as di(ω-hydrododecafluoroheptanoyl)peroxide (hereinafter referred to as "DHP") (0.57 part) was injected, the reaction was initiated. During the reaction period, TFE was injected to increase the pressure to from 8.0 to 8.5 Kg/cm$^2$G as the pressure dropped.

After 50 minutes of the reaction, methanol (3.5 parts) as a chain transfer agent was added to control molecular weight of the copolymer. After 5 hours from the reaction initiation, DHP (0.29 part) was added. After the reaction was continued for 10.8 hours, unreacted monomers and polymer particles were recovered. The particles were washed with water by means of a mixer and dried at 120° C. for 24 hours to obtain the copolymer (88 parts). Composition of the copolymer: HFP, 12.8%; n-1VE, 1.5%. M.P. 265° C. Specific melt viscosity 2.1×10$^4$ poise.

EXAMPLE 2

In the same manner as in Example 1 but using 4 parts of n-1VE and 17 parts of methanol and continuing the reaction for 8.5 hours, the reaction was effected to obtain the copolymer (62 parts). Composition of the copolymer: HFP, 10.3%; n-1VE, 0.7%. M.P. 274° C. Specific melt viscosity 2.4×10$^4$ poise.

EXAMPLE 3

In a glass lined autoclave equipped with a stirrer, which can contain 30 parts of water, demineralized and deaerated water (10 parts) and sodium bicarbonate (0.01 part) were charged. The interior was replaced thoroughly with pure nitrogen gas and evacuated. Thereafter, n-1VE (0.36 part) was injected, followed by HFP (10 parts). The mixture in the autoclave was stirred at 24° C. Then, the autoclave was pressurized with THF to 8.4 Kg/cm$^2$G. As soon as DHP (0.05 part) was injected, the reaction was initiated. During the reaction period, TFE was injected to maintain the pressure at 8.4 Kg/cm$^2$G. After 6, 11, 16, 21 and 26 hours from the reaction initiation, DHP (each 0.005 part) was added. After 3, 8, 15 and 26 hours of the reaction, methanol (each 0.11 part) was added to control molecular weight of the copolymer. After the reaction is continued for 33 hours, unreacted monomers and polymer particles were recovered. The particles were washed with water by means of a mixer and dried at 120° C. for 24 hours to obtain the copolymer (8.5 parts). Composition of the copolymer: HFP, 11.3%; n-1VE, 2.0%. M.P. 265° C. Specific melt viscosity 1.6×10$^4$ poise.

EXAMPLE 4

In the same manner as in Example 3 but adding DHP (0.03 part) to initiate the reaction and DHP (each 0.003 part) after 6, 11 and 16 hours from the reaction initiation, adding methanol (each 0.1 part) after 2, 11 and 15 hours from the reaction initiation and continuing the reaction for 23 hours, the reaction was effected to obtain the polymer (4.3 parts). Composition of the copolymer: HFP, 11.2%; n-1VE, 2.2%. M.P. 269° C. Specific melt viscosity 4.4×10$^4$ poise.

EXAMPLE 5

In the same manner as in Example 3 but adding DHP (0.03 part) to initiate the reaction and DHP (each 0.003 part) after 6, 11, 16 and 21 hours from the reaction initiation, adding methanol (each 0.11 part) after 3, 14 and 22 hours from the reaction initiation and continuing the reaction for 24 hours, the reaction was effected to obtain the copolymer (4.4 parts). Composition of the copolymer: HFP, 10.7%; n-1VE, 0.9%. M.P. 265° C. Specific melt viscosity $5.5 \times 10^4$ poise.

EXAMPLE 6

In the same manner as in Example 1 but using

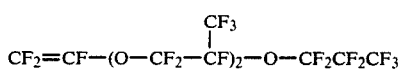

(hereinafter referred to as "n-2VE") (10 parts) in place of n-1VE, adding 5.3 parts of methanol and continuing the reaction for 7.8 hours, the reaction was effected to obtain the copolymer (64.5 parts), M.P. 266° C. Specific melt viscosity $2.4 \times 10^4$ poise.

EXAMPLE 7

In the same manner as in Example 1 but using 4 parts of n-2VE and 5.3 parts of methanol and continuing the reaction for 8.5 hours, the reaction was effected to obtain the copolymer (71.3 parts) M.P. 268° C. Specific melt viscosity $2.1 \times 10^4$ poise.

COMPARATIVE EXAMPLES 1 to 3

In the same manner as in Example 1 but using no perfluorovinyl ether (I) (in Comparative Example 1) or using n-0VE in place of n-1VE, adding predetermined amount of methanol and continuing the reaction for predetermined period, the reaction was effected to obtain the copolymer. The amount, the composition, melting point and specific melt viscosity of the copolymer are shown in Table 1.

TABLE 1

| Comparative Example No. | Perfluoro-vinyl ether (part) | Methanol (part) | Reaction time (hr) | Copolymer Amount (part) | Composition (%) HFP | Composition (%) n-0VE | M.P. (°C.) | Specific melt viscosity (poise) |
|---|---|---|---|---|---|---|---|---|
| 1 | — | 3.5 | 6.3 | 64 | 13.1 | — | 264 | $5.4 \times 10^4$ |
| 2 | n-0VE (10.5) | 10.0 | 8.5 | 98 | 9.8 | 2.6 | 267 | $2.6 \times 10^4$ |
| 3 | n-0VE (4.0) | 10.0 | 10.3 | 74 | 9.3 | 1.2 | 276 | $1.8 \times 10^4$ |

Stress crack resistance of the thus obtain copolymers was tested by a severe test method as follows.

PREPARATION OF TEST PIECE

The copolymer (35 g) was charged in a mold of 80 mm in inner diameter, the bottom of which was covered with aluminum foil, and covered with another aluminum foil to sandwich the copolymer with the foil. Then, the mold containing the copolymer was kept in a heating press at 330° C. and pressed under a pressure of 45 Kg/cm² for 2 minutes. Immediately thereafter, the mold was cooled with water while pressing under a pressure of 50 Kg/cm² to obtain a sheet of 2 mm in thickness. The thus obtained sheet was stamped out to form a test piece of No. 1 dumbbell shape according to JIS (Japanese Industrial Standard) K 6301. On the center line perpendicular to the long axis of the test piece, a notch of 5 mm in width and 0.4 mm in depth was made.

STRESS CRACK RESISTANCE TEST

The thus prepared test piece was attached to chucks of a tensile machine (TOM-500, Shinko Tsushin Kabushikikaisha), a constant temperature bath of which was kept at 200° C. After 10 minutes, crossheads were moved at a rate of 5 mm/min. to reach stress of 8.9 Kg/cm². Under this condition, stress lowered by stress relaxation was increased to 8.9 Kg/cm² every 8 minutes, and the period necessary to break the test piece was measured three times and averaged.

Following the above procedure, stress crack resistance of the polymers obtained in Example 2 and Comparative Examples 1 and 3 was measures. The results are shown in Table 2.

TABLE 2

| Copolymer | Breaking time (min.) |
|---|---|
| Example 2 | 60 |
| Comparative Example 1 | 4 |
| Comparative Example 3 | 10 |

A test piece prepared from the copolymer obtained in Example 1 or Comparative Example 2 was attached to the chucks. After 10 minutes, crossheads were moved at a rate of 5 mm/min. to reach stress of 29.4 Kg/cm². Under this condition, stress lowered by stress relaxation was increased to 29.4 Kg/cm² every 8 minutes. The breaking time was shown in Table 3.

TABLE 3

| Copolymer | Breaking time (min.) |
|---|---|
| Example 1 | 47 |
| Comparative Example 2 | 34 |

EXAMPLES 8 TO 10 AND COMPARATIVE EXAMPLE 4

Each copolymer obtained in Examples 3 to 5 and Comparative Example 2 was shaped into pellets, each having a diameter of about 3.0 mm and a length of about 3.0 mm and coated on a wire having a diameter of about 0.40 mm by means of an extruder for wire coating under the following conditions:

EXTRUDER FOR WIRE COATING

Diameter of cylinder: 30 mm
L/D of screw: 22
Compression ratio: 2.74
Diameter of die tip: 4 mm×7 mm
Temperature in cylinder
  rear: 360° C.

middle: 390° C.
front: 400° C.
Temperature in adaptor: 400° C.
Temperature in die head: 410° C.
Temperature in die tip: 410° C.

Coated wire was produced with a drawdown ratio of about 100. Maximum coating rate and physical properties of the produced coated wire are shown in Table 4.

TABLE 4

| | Copolymer | Maximum coating rate (m/min.) | Thickness of coating (mm) | Mechanical properties | |
|---|---|---|---|---|---|
| | | | | Tensile strength (Kg/mm$^2$) | Elongation (%) |
| Example 8 | Example 5 | 55 | 0.15 | 2.99 | 428 |
| Example 9 | Example 4 | 75 | 0.18 | 3.66 | 501 |
| Example 10 | Example 3 | 200 | 0.16 | 3.68 | 556 |
| Comparative Example 4 | Comparative Example 2 | 45 | 0.15 | 2.85 | 454 |

What is claimed is:

1. A fluorine-containing copolymer consisting essentially of monomeric units of
    (a) from 95.8 to 80% by weight of tetrafluoroethylene,
    (b) from 4 to 14% by weight of hexafluoropropene, and
    (c) from 0.2 to 6% by weight of perfluorovinyl ether of the formula:

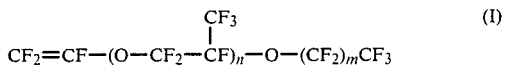

wherein n is an integer of 1 to 4, and m is an integer of 0 to 3.

2. The fluorine-containing copolymer according to claim 1 consisting essentially of monomeric units of from 94.5 to 83% by weight of tetrafluoroethylene, from 5 to 13% by weight of hexafluoropropene and from 0.5 to 4% by weight of the perfluorovinyl ether (I).

3. The fluorine-containing copolymer according to claim 1, wherein n in the formula (I) is 1 or 2.

4. A molded product formed from the copolymer of claim 1.

5. A molded product formed from the copolymer of claim 2.

6. A molded product formed from the copolymer of claim 3.

* * * * *